June 17, 1930.  J. C. BURFORD  1,765,202
FLANGE OILER
Filed Nov. 1, 1927
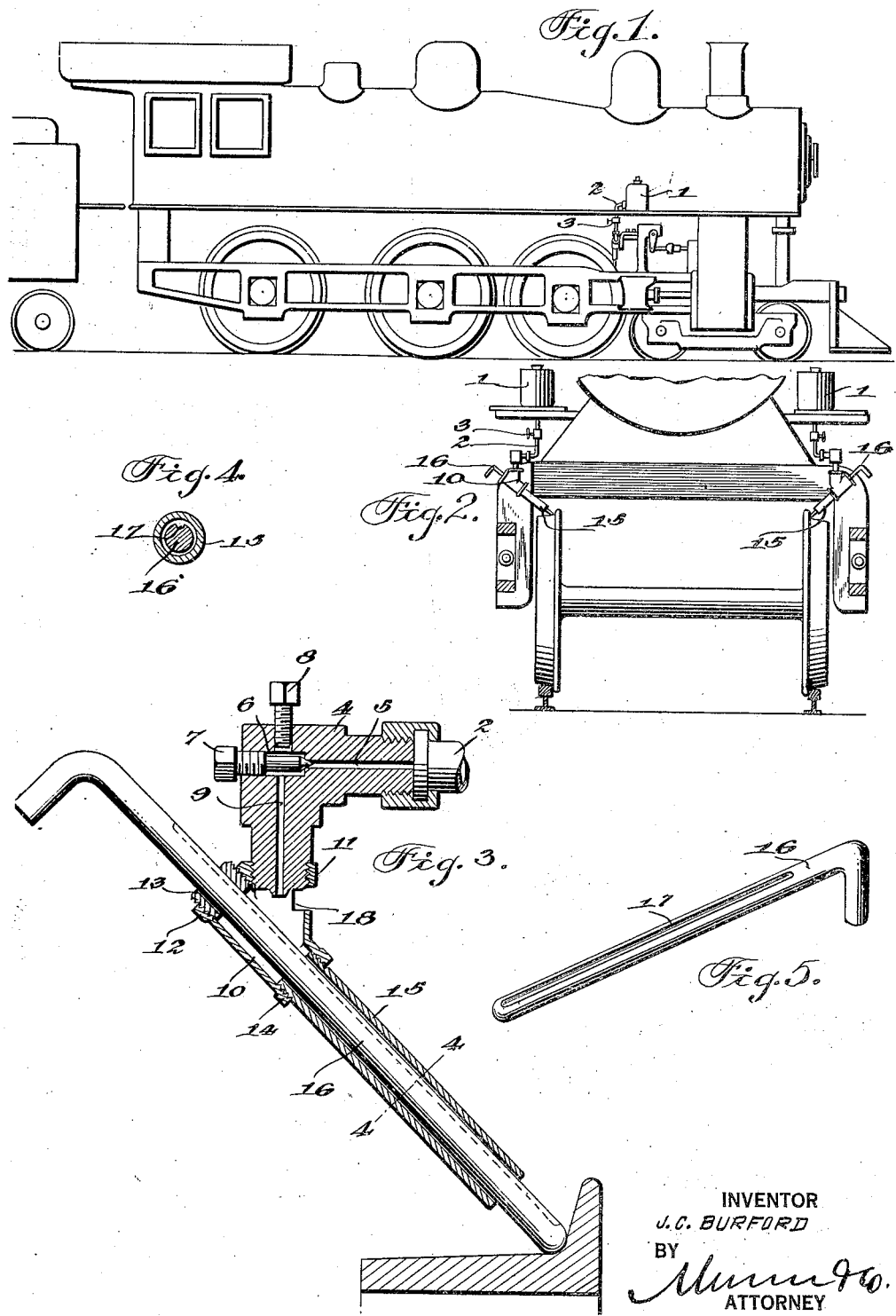

Patented June 17, 1930

1,765,202

UNITED STATES PATENT OFFICE

JAMES C. BURFORD, OF WINSTON-SALEM, NORTH CAROLINA

FLANGE OILER

Application filed November 1, 1927. Serial No. 230,294.

This invention relates to a flange oiler for locomotive wheels.

The principal object of this invention is the production of a simple and efficient mechanism for a flange oiler, whereby the lubricant may be directed against the flange of the wheel which is brought into direct contact with the sides of the treads of the rails.

It is a further object to provide an automatic oiling means, whereby oil is fed to the flange of a wheel by operation of the plunger acting in direct contact with a wheel.

It is a further object to provide an oiler, which is operated by the inequalities in a road surface.

With these and other objects in view, this invention consists in certain novel combinations, construction and arrangement of parts as will hereinafter be fully described.

In the accompanying drawing, wherein like reference numerals are employed to designate like parts throughout the same:

Figure 1 is a side elevation of a locomotive equipped with my flange oiler.

Figure 2 is a cross section thereof.

Figure 3 is a longitudinal sectional view of the flange oiler.

Figure 4 is a cross section thereof on the line 4—4 of Figure 3, and

Figure 5 is a detail perspective view of the oil feeding plunger.

Referring to the drawing, I designate an oil receptacle 1 having suitable pipe connections 2, and a cut-off valve 3. The pipe fitting 4, which, in the present instance, is shown in the form of an elbow is provided, having a central bore 5 leading from the pipe connection 2. One end of the fitting 4 is enlarged, as at 6, providing a well, the outer portion of said well being threaded for reception of a needle valve 7. The needle valve is disposed in line with the passage 5, whereby the flow of lubricant from the receptacle 1 may be regulated. A cleanout plug 8 is illustrated, and by removal of this plug the passage of the elbow may be readily cleaned. A bore 9, communicating with the passage 6, permits ready feeding of lubricant to a pipe fitting 10. The pipe fitting, in the present instance, is branched, providing extensions 11 and 12. One extension 11 of the fitting 10 is threaded on the elbow 4 in a manner to dispose said fitting at an angle. The remaining branch 12 of the fitting 10 is interiorly threaded and has secured therein a bushing 13. The opposite extremity of the pipe fitting is also threaded, as at 14, and has a guide sleeve 15 secured therein. A lubricant feeding plunger 16 is disposed through the bushing 13 and the guide sleeve 15, this plunger being of sufficient length to extend into contact with the flange of a wheel. The plunger 16 may be provided with a longitudinal groove 17 extending the major length of said plunger, thus affording a guiding means for lubricant.

It should be noted that the plunger 16 has a sliding fit with the bushing 13, and is relatively free of contact with the guide sleeve 15. By this arrangement, it will be seen that oil from the receptacle 1 will have free passage through the various fittings to the plunger, and be there conveyed to a wheel flange.

In practice, it has been found that the oil passages often become clogged with sediment, thus preventing passage of the oil from the reservoir to the wheel flange. I therefore provide the fitting 10 with a sight opening 18, and it will be noted that this opening is so positioned with respect to the oil passage 9 that the flow of oil may be readily seen. Also, by the provision of the sight opening, the amount of oil passing through the lubricator can be accurately determined by adjustment of the needle valve 7.

The operation of my device is as follows. Lubricant being supplied to the container or reservoir 1, the flow of oil being regulated by the needle valve 7 and the sight opening 18, lubricant will be supplied to the fitting 10, and from there will be permitted to flow by gravity down the plunger 16 and will be guided by the sleeve 15 to the flange of a wheel.

As there is considerably more friction between the rails of a track and the flange of a wheel of a locomotive upon curves or inequalities in the road surface, it is desirable that a greater amount of lubricant is distributed upon the flange of a wheel, and, therefore, my device will cause a greater quantity to be fed under such circumstances. That is to say, the flange of a wheel during a turning movement of a locomotive will have a tendency to reciprocate the plunger 16, thus causing a free flow of the oil.

From the foregoing description, it will be seen that a very simple and efficient means has been produced for feeding lubricant to the flange of a wheel, and one that is readily produced from standard fittings, and providing a device which is readily cleaned.

It is to be understood that the form of my invention herewith shown and described is to be taken as a preferred example of the same, and that various changes in the shape, size and arrangement of parts may be resorted to without departing from the spirit of my invention or the scope of the subjoined claim.

I claim:

In a flange lubricator, a reservoir, a pipe fitting, said fitting comprising angular extensions, a bore formed through each of said extensions, a plug closing one of said bores, a needle valve arranged to seat within said other bore to regulate the flow of lubricant through said bores, a second pipe fitting upon one of said extensions, said second named pipe fitting having a sight and vent opening, said opening being disposed so as to intercept the bore of said extension at right angles, means to conduct lubricant from said reservoir to said first named fitting, and means to supply lubricant to said flange.

JAMES C. BURFORD.